March 31, 1959           W. C. SMITH           2,879,823
RUBBER TIRE CONTAINING BUTYL RUBBER, A QUINOID
COMPOUND, AND AN AMIDO COMPOUND, AND
PROCESS OF PREPARING
Filed April 16, 1956
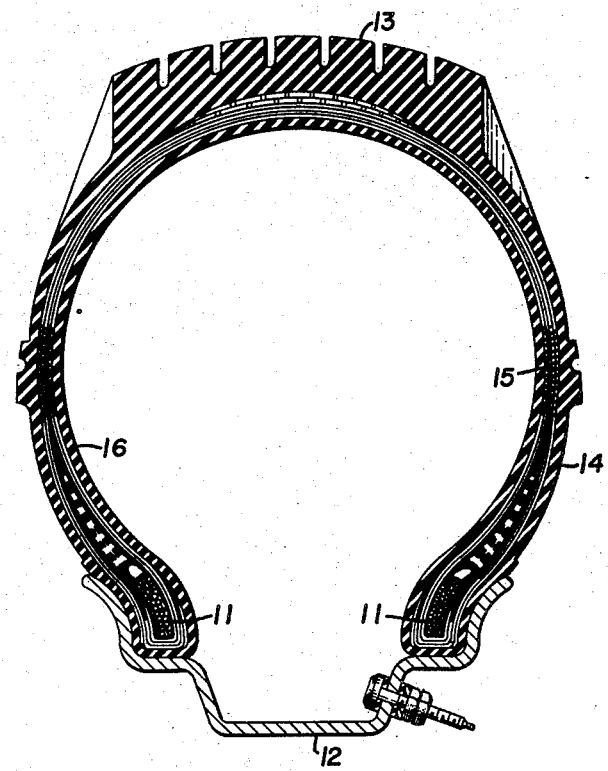
Winthrope C. Smith     Inventor
By    *W. H. Smyers*   Attorney United States Patent Office 2,879,823
Patented Mar. 31, 1959

2,879,823

RUBBER TIRE CONTAINING BUTYL RUBBER, A QUINOID COMPOUND, AND AN AMIDO COMPOUND, AND PROCESS OF PREPARING

Winthrope C. Smith, Westfield, N.J., assignor to Esso Research and Engineering Company, a corporation of Delaware Application April 16, 1956, Serial No. 578,228

18 Claims. (Cl. 152—330)

This invention relates to improved methods for curing butyl rubber or mixtures of butyl rubber with more highly unsaturated synthetic rubbers. The invention relates more particularly to the curing of butyl rubber or mixtures of butyl rubber and synthetic rubbery copolymers such as of butadiene and styrene in the substantial absence of elemental sulfur by the use of certain amido compounds in conjunction with quinoid-type vulcanization agents.

It has heretofore been considered somewhat impractical to cure butyl rubber with non-sulfur curing agents; i.e. in the absence of elemental sulfur, in spite of certain disadvantages connected with the use of sulfur. This attitude results from the fact that the sulfur component in the vulcanization of butyl rubber permits short curing times.

One of the disadvantages of using sulfur is that it has been considered impossible to obtain satisfactory vulcanizates from blends of butyl rubber with substantial quantities of more highly unsaturated rubbers such as GR–S rubber, since the tensile properties of the resulting vulcanizates are drastically lowered. Also, severe blistering and porosity of the vulcanizates are encountered when attempting to cure such blends with conventional sulfur curatives, particularly when the blends contain a substantial amount of butyl rubber, e.g. 20% or more, especially 50 to 80%.

It has also heretofore been impractical to cure butyl rubber rapidly with nonsulfur curing agents without obtaining excessive prevulcanization (scorching) during mixing, extruding or calendering operations.

The present invention overcomes the foregoing difficulties and affords a rapid non-sulfur cure for butyl rubber or blends of butyl with more highly unsaturated rubbers such as GR–S rubber as will be apparent from the following description wherein reference will be made to the accompanying drawing in which the single figure is a cross-sectional view of a pneumatic tubeless tire employing therein the butyl rubber compositions of the invention.

According to the present invention, it has now been found that high quality, fast curing vulcanizates of butyl rubber or butyl rubber with more highly unsaturated rubbers such as rubbery copolymers of butadiene and styrene (GR–S rubber) may be obtained by the use of quinoid-type curing agents which do not depend upon sulfur for their effect, in combination with amido compounds of the general formula:

(I)
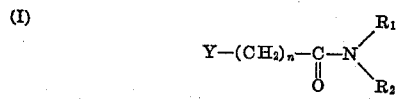

wherein Y is hydrogen or such radicals as alkyl, acylated alkyl, aralkyl, alkaryl, aryl, hydroxy alkyl, hydroxy aryl, acyl, or amido. Subscript "$n$" represents an integer between about 0 to 15, preferably 0 to 8 or 10, $n$ plus the number of carbon atoms in Y amounting to about 1 to 20. In the above formula, $R_1$ and $R_2$ may be any of the following: hydrogen, halogen, alkyl, aralkyl, alkaryl, aryl, hydroxy alkyl, or hydroxy aryl and may contain from about 1 to 25 carbon atoms, preferably 6 to 12 carbon atoms. The amount of amido compound employed according to the invention is advantageously between about 0.1 to 15.0 parts by weight, preferably between about 0.5 to 5.0 parts by weight per 100 parts by weight of total rubber hydrocarbon. The use of amido compounds in accordance with the invention is particularly effective in accelerating quinoid type cures of butyl rubber compositions which do not contain other rubbery polymers and it is to this use that the present invention is especially directed. The use of amido compounds in accordance with the invention for curing compositions in which the sole rubbery component is butyl rubber provides an especially rapid cure without the risk of excessive prevulcanization or scorching during processing.

Specific compounds which are suitable for the purposes of the present invention include lauroyl para-amino phenol, salicylamide, malonamide, benzanilide, succinamide, adipamide, glutaric amide, glycollic amide, lauric amide, caproic amide, capric amide, toluylic amide, palmitic amide, stearamide, oxaminic amide, oxybenzoic amide, lactic amide, levulinic amide, malic amide, gallic amide, hippuric amide, tartaric amide, tartronic amide, benzamide, oxamide, acetanilide, diacetanilide, etc.

The above compounds fall within certain classes typified by the following formulae:

(II)
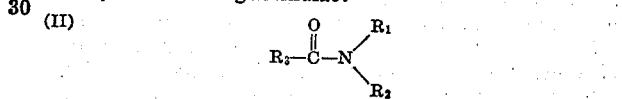

wherein $R_1$ and $R_2$ are as in the generic formula; $R_3$ being hydrogen or an alkyl, aralkyl, alkaryl, aryl, or aceto alkyl group containing 8 to 20 carbon atoms. A preferred compound according to the foregoing is stearamide;

(III)
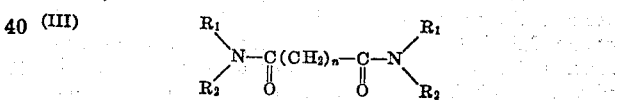

wherein $n$ is an integer between 1 to 8. A preferred compound according to the foregoing is adipamide; and (IV)
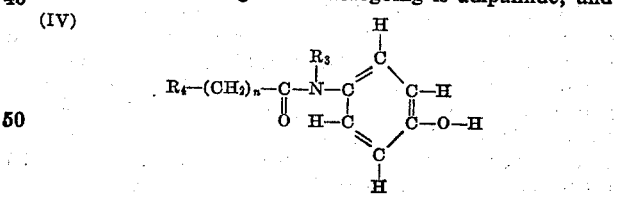

wherein $R_4$ is one of the following radicals: hydrogen or an alkyl, aralkyl, alkaryl or aryl group having 1 to 20 carbon atoms. A preferred compound according to the foregoing is lauroyl para amino phenol.

In accordance with the invention, about 100 parts by weight of a rubbery butyl copolymer or an admixture of about 10 to 90 parts of said copolymer with about 10 to 90 parts of a synthetic rubber such as GR–S rubber, is cured for a time of about 10 to 200 seconds at a temperature between about 300° and 500° F. in the substantial absence of sulfur with a combination of about 0.25 to 15.0, preferably about 1 to 5 parts by weight of the foregoing amido compounds and about 0.5 to 15.0, preferably 1 to 8 parts by weight of non-sulfur quinoid curing agents. About 2 to 30, preferably 5 to 20 parts of zinc oxide, 0 to 50 parts of a paraffinic, naphthenic or aromatic hydrocarbon plasticizer oil, and 10 to 150 parts of a filler such as a clay, a carbon black, or mixtures thereof are also advantageously added. In general, curing agents comprising organic compounds having an —N=O or =N—O—H group attached to an aromatic nucleus (quinoid compounds) such as meta, or especially para quinone dioxime; meta, or especially para dinitrosobenzene and derivatives of these materials may be used. Quinone dioxime and its derivatives are relatively inactive unless employed in conjunction with oxidizing agents such as oxygen containing carbon blacks, $PbO_2$, $Pb_2O_3$, $Pb_3O_4$ or materials in the class of chloro hydantoin or chloro alkyl sulfonamides. Dinitroso compounds and their derivatives are active without oxidizing agents. Such materials include:

P-quinone dioxime, p-quinone dioxime diacetate, p-quinone dioxime di caproate, p-quinone dioxime di laurate, p-quinone dioxime di stearate, p-quinone dioxime di crotonate, p-quinone dioxime di naphthenate, p-quinone dioxime succinate, p-quinone dioxime adipate, p-quinone dioxime difuroate, p-quinone dioxime dibenzoate, p-quinone dioxime di (o chloro benzoate), p-quinone dioxime di p-chloro benzoate, p-quinone dioxime di (p-nitro benzoate), p-quinone dioxime di (m-nitro benzoate), p-quinone dioxime di (3,5 dinitro benzoate), p-quinone dioxime di (p-methoxy benzoate), p-quinone dioxime di (n-amoxy benzoate), p-quinone dioxime di (m-bromo-benzoate), p-quinone dioxime di (phenyl acetate), p-quinone dioxime di-cinnamate, p-quinone dioxime di (n-phenyl carbamate), bis ethoxy methyl ether of quinone dioxime, mono-zinc salt of quinone dioxime, di-zinc salt of quinone dioxime, zinc chloride double salt of quinone dioxime, mono mercury salt of quinone dioxime, di mercuric salt of quinone dioxime, mercuric chloride double salt of quinone dioxime, mono barium chloride double salt of quinone dioxime, mono-cupric salt of quinone dioxime, mono lead salt of quinone dioxime, mono barium salt of quinone dioxime, mono magnesium salt of quinone dioxime, mono calcium salt of quinone dioxime, silver salt of p-quinone dioxime, 1,4-naphthoquinone dioxime, chloro methyl quinone dioxime, 2,6-dimethyl 1-4 quinone dioxime, 2 phenyl 1,4 quinone dioxime, 2 benzyl-1,4 quinone dioxime, 2 ethyl-1,4 quinone dioxime, thymo quinone dioxime, 2 chloro p-quinone dioxime, thymo-quinone dioxime dibenzoate, thymo-quinone dioxime diacetate, thymo-quinone succinate, phloro glucinal trioxime, 2,5 dinitroso-4 isopropyl toluene, p-dinitroso benzene, m-dinitroso benzene, quinone dichlorimine, 2,4-dinitro-1-naphthol, 2,6-dichloro quinone mono chlorimine, p-quinone dioxime phospho chloride, etc.

Specific quinoid curing compositions include a combination of paraquinone dioxime and a lead oxide, said combination being capable of vulcanizing butyl rubber or mixtures of butyl and GR–S rubber. The chemical reactions involved in the vulcanization of the polymer by paraquinone dioxime in the presence of a lead oxide, preferably a lead multioxide, appear to involve the formation of aromatic nitroso groups which in turn react with the polymer chain. Preferred paraquinone dioxime concentrations are from about 0.5 to 10.0, preferably 1 to 3 parts by weight per 100 parts of total rubber hydrocarbon; the lead oxide concentrations advantageously being from about 2 to 30, preferably about 5 to 10 parts by weight on the same basis. The quantities of 1 to 3 parts by weight of paraquinone dioxime and about 5 to 10 parts of a lead multioxide such as $Pb_3O_4$ is the most efficient combination.

The action of paraquinone dioxime dibenzoate is similar to that of paraquinone dioxime when employed in combination with lead oxides, preferably lead multioxides. The following concentrations are suitable; about 0.5 to 15, preferably about 5 to 8 parts by weight of paraquinone dioxime dibenzoate per 100 parts of polymer and about 2 to 30, preferably about 8 to 15 parts by weight of $Pb_3O_4$ on the same basis.

Also, benzothiazyl disulfide acting in combination with paraquinone dioxime causes cleavage of the disulfide to form two mercaptan molecules; there also being a conversion of the dioxime to the nitroso group brought about by the loss of a hydrogen atom. Therefore, the above combination of benzothiazyl disulfide with paraquinone dioxime is also an effective non-sulfur curing composition for butyl rubber or butyl rubber with more highly unsaturated synthetic rubbers such as GR–S rubber and Buna–N rubber. The following limits are preferred for this particular cure; about 1 to 20, preferably 3 to 10 parts by weight of benzothiazyl disulfide per 100 parts of polymer and about 0.5 to 10.0, preferably 1 to 3 parts of paraquinone dioxime on the same basis. Obviously combinations of both a lead oxide and benzothiazyl disulfide may be advantageously employed with quinone dioximes in view of the foregoing description.

The vulcanization mixture preferably comprises, in parts by weight, about:

| Component | General Range | Preferred Range |
|---|---|---|
| Butyl Rubber | 100 | 100 |
| Lead Oxide [1] | 0.5–30 | 3–10 |
| Quinone Dioxime (or derivative) | 0.5–15 | 1–8 |
| Amido Compound | 0.25–15 | 1–5 |
| Zinc Oxide | 0–30 | 3–20 |
| Filler (e.g. carbon black and/or clays and/or $TiO_2$ etc.) | 0–150 | 50–100 |
| Benzothiazyl Disulfide | 0–15 | 2–10 |
| Para-dinitrosobenzene | 0–10 | 0.1–2.0 |
| Mold Release Agent (e.g. stearic acid) | 0–5 | 0.2–1.0 |

[1] Suitable lead oxides include $PbO_2$, $Pb_2O_3$, $Pb_3O_4$, etc.

Butyl rubber comprises a copolymer of a major proportion of a $C_4$–$C_8$ isoolefin such as isobutylene with a minor proportion of a $C_4$–$C_{14}$, preferably a $C_4$–$C_8$ multiolefin prepared at low temperatures by Friedel-Crafts catalysis. The preferred multiolefins are isoprene, butadiene, cyclopentadiene, myrcene, allo-ocymene, and the like; isoprene being preferred.

In preparing butyl rubber, the monomeric isoolefin and the multiolefin are mixed in the ratio of a major proportion of the isoolefin and a minor proportion of the multiolefin, the preferred range being about 85 to 99.5 parts by weight of the isoolefin to about 0.5 to 15 parts of the multiolefin. High purity is desirable in both materials, it being preferable to use an isoolefin of at least 98% purity although satisfactory copolymers may be made from multiolefins of considerably lower purity.

The mixture of monomers is cooled to a temperature within the range between about 0° to —200° C., preferably —40° C. to —160° C., the preferred range being between —60° C. and —130° C. The materials may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane, liquid ethylene etc. are satisfactory.

The cold mixture is then polymerized by the addition thereto of a Friedel-Crafts catalyst, preferably an aluminum halide catalyst in liquid or dissolved form (e.g. dissolved in an alkyl halide). It is ordinarily found that an amount of catalyst ranging from about 0.15% to about 1.0% of the weight of mixed olefins is satisfactory to polymerize the monomers into a high molecular weight polymer.

In the polymerization reaction, the liquid catalyst may be sprayed onto the surface of the rapidly-stirred, cold olefinic material, or a small high-pressure stream of catalyst may be directed into the body of the rapidly-stirred cold olefinic material. In either process, powerful and efficient stirring and agitating is desirable to disperse the catalyst rapidly into the cold olefinic material.

The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, an ether, an aldehyde or an organic acid to inactivate the catalyst. The warm water may also serve the purpose of flashing off the excess refrigerant, the unpolymerized olefins and catalyst solvent. The polymer is then recovered from the water suspension in any convenient manner, such as straining or filtering or otherwise, as may be convenient. The polymer is then dried either as a blanket passing through a tunnel drier, or on the mill, as desired. The resulting product is a plastic, elastic vulcanizable material.

As so produced, the polymer has a Staudinger molecular weight, within the range between approximately 20,000 to 150,000, advantageously 35,000 to 100,000, the preferred range being between 45,000 and 60,000. The material also generally has a Wijs iodine number between about 1 and a maximum of about 50, although the preferred iodine number is usually about 5 to 15. The preparation of the above rubbery butyl copolymer is described in U.S. 2,356,128 to which reference may be had for further details.

The more highly unsaturated synthetic rubbers such as rubbery copolymers of butadiene and styrene (GR-S) may be convenient. The polymer is then dried either as system or in aqueous emulsion or by any other method of forming polymers. If the homogeneous method of polymerization is used, it is convenient to initiate the polymerization by heating the monomer mixture to a temperature between room temperature and about 100° C., preferably in the presence of a substance capable of accelerating the reaction such as a peroxide and in the presence of a solvent for the reagents. When polymerization is complete, which usually requires several days by this method, the copolymer is separated from unreacted monomer and/or solvent if these are present and the resulting rubbery material is then processed in the usual manner.

The most efficient and preferred method of polymerizing the monomer mixtures in the preparation of GR-S rubber is to carry out the reaction in an aqueous emulsion. In this process a mixture of about 60 to 90% butadiene with about 10 to 40% styrene is emulsified with water by means of a suitable emulsifying agent. A polymerization initiator or accelerator is then preferably added together perhaps with other substances which activate the accelerator or which otherwise influence the polymerization in a desired manner. The monomers in the emulsion are allowed to copolymerize by continuously agitating the same at a temperature about 0 to 80° C., preferably 5 to 60° C. for a time sufficient to complete the reaction, usually from about 2 or 5 to 150 hours. The rubbery copolymer is obtained in the form of an aqueous dispersion resembling natural rubber latex to which an age resistor or antioxidant may be added, if desired, and which may then be utilized as such or coagulated by the same methods used to coagulate natural rubber latex, for example, by addition of an acid, alcohol or salt or by a combination of these methods. The polymerization products are washed and dried to produce a crude rubber-like material which may then be processed in substantially the same manner as natural rubber.

A large number of materials may be used in the above process to bring about emulsification of the monomer mixture with water. Ordinary soaps such as the sodium or potassium salts of saturated or unsaturated fatty acids, for example, sodium myristate, sodium palmitate and sodium oleate or synthetic soap-like materials, such as aliphatic sulfates or sulfonates, aromatic sulfonates, and salts of high molecular weight aliphatic bases; for example, sodium lauryl sulfate, sodium naphthalene sulfonate, the hydrochloride of diethyl aminoethyloleyl amide and cetyltrimethyl ammonium methyl sulfate, or other emulsifying agents are satisfactory. A very effective emulsifying solution is one which contains a saturated fatty acid such as myristic acid which has been from about 70 to 95% neutralized with an alkali.

An equally large number of substances is available for selection of the polymerization accelerator or catalyst to be employed in the emulsion polymerization process. Substances soluble in either the aqueous phase or non-aqueous phase of the emulsion may be used. Among the polymerization accelerators are the organic and inorganic peroxides such as hydrogen peroxide, diacyl peroxides and benzoyl peroxide, metal perborates, persulfates and percarbonates, diazo compounds such as diazoamino benzene, dipotassium diazomethane disulfonate, etc. Substances which activate or catalyze the action of the polymerization accelerator may also be used therewith. Such compounds as sodium pyrophosphate, sodium oxalate, urea, glycine, and the like have been found to act as activators for the peroxide type accelerators.

According to the present invention, as aforesaid, the above two types of polymers (i.e. butyl rubber and GR-S rubber) may be mixed in any proportion and cured together by means of combinations of non-sulfur quinoid type curing agents and amido compounds.

The advantages of the invention will be understood from a consideration of the following experimental data:

EXAMPLE I

Two hundred parts by weight of a commercial butyl rubber—"A" (corresponding to GR-I-35) were mixed and heated with 0.6 parts by weight of para-dinitroso benzene on a rubber mill for 5 minutes at 300° F.; advantageous ranges for time and temperature being about 3 to 30 minutes and about 340° to 280° F. respectively. The above mixture was blended on the mill at room temperature (20° C.) for 15 minutes with the following:

| Component: | Parts by weight |
|---|---|
| Para quinone dioxime | 3.0 |
| Zinc oxide | 10.0 |
| Calcined kaolin (commercial grade) | 180.0 |
| Carbon black (SRF black) | 20.0 |
| $Pb_3O_4$ | 10.0 |
| Benzothiazyl disulfide | 8.0 |
| Stearic acid | 1.0 |

The above compounded butyl rubber stock formed was then divided into two equal samples, sample #1 being a control containing no added amido compound. Sample #2 was blended with 1.95 parts by weight of stearamide at room temperature according to the invention. Portions of each sample were then taken, each unvulcanized stock being placed in a conventional Mooney viscosimeter and preheated at a temperature of 250° F. for 2 minutes. The machine including a rotor contained therein was then started. The Mooney viscosity was obtained every 30 seconds. The time in minutes to obtain a 3 point rise (Mooney Scorch) and a 23 point rise (Mooney Scorch Cure) over the low were then recorded. The results are shown below:

*Time in minutes*

| | Portion #1 | Portion #2 |
|---|---|---|
| Mooney Scorch | 5.5 | 3.5 |
| Mooney Scorch Cure | 11.5 | 7.5 |

It is evident from the above data that the quinoid cure rate of butyl rubber in the presence of an amido compound such as stearamide (portion #2) according to the present invention was about 1.5 times as fast compared to the control (portion #1).

EXAMPLE II

The remaining portions of samples #1 and 2 (which had not been tested in the Mooney viscosimeter), hereinafter referred to as portions #3 and 4 respectively, were then vulcanized (cured) by heating at a temperature of 400° F. for times of 10, 20 and 40 seconds. The physical inspections of the vulcanizates are shown below.

|  | Quinoid Cure without Stearmide | | | Quinoid Cure with Stearmide | | |
|---|---|---|---|---|---|---|
| Portion | #3 | | | #4 | | |
| Time (Seconds) | 10 | 20 | 40 | 10 | 20 | 40 |
| Tensile Strength (p.s.i.) | 580 | 780 | 1,000 | 640 | 1,040 | 1,120 |
| Modulus at 200% Elongation | 250 | 360 | 420 | 300 | 400 | 430 |
| Elongation (Max.) | 420 | 400 | 440 | 450 | 510 | 500 |

The above data show that only a 20 seconds curing time is required to produce a vulcanizate according to the invention (portion #4) having a tensile strength of 1040 p.s.i. However, when omitting the amido compound according to the prior art (portion #3), a curing time of 40 seconds was required to produce a vulcanizate having a tensile strength of only 1000 p.s.i. In a like manner, it is noted that the maximum elongation (elongation at break) according to the invention at a cure of 20 seconds is 510% (portion #4) whereas the maximum elongation without the use of amido compounds according to the prior art (portion #3) at a cure of 20 seconds is only 400%.

EXAMPLE III

Examples I and II were repeated except that 2 parts by weight of N-lauroyl p-amino phenol were substituted for the 1.95 parts by weight of stearamide. The Mooney scorch was 4.5 minutes compared to 5.5 minutes for the prior art composition, the Mooney scorch cure being only 8.0 minutes as compared to 11.5 for the prior art composition. The physical inspection of the vulcanizate was as follows:

| Curing Time (Seconds) | 10 | 20 | 40 |
|---|---|---|---|
| Tensile Strength (p.s.i.) | 770 | 950 | 970 |
| Elongation (max.) | 500 | 510 | 530 |

The above data show that the tensile strength of the composition of the invention employing N-lauroyl p-amino phenol was raised to 950 p.s.i. in only 20 seconds whereas the control composition of the prior art (supra) had a tensile strength of only 780 p.s.i. for the same duration cure. Curing the prior art composition for twice as long only raised the tensile strength to 1000 p.s.i. A comparison of the maximum elongation of the control cured for 10 to 40 seconds shows that values of only 400 to 440% were obtained compared to 500 to 530% for the composition which was cured in the substantial absence of sulfur according to the invention with a quinoid curing agent (para quinone dioxime) plus an amido compound (N-lauroyl p-amino phenol).

Although, in the foregoing examples, the butyl rubber was pre-processed with para dinitroso benzene, this is an optional but preferred step. It is also desirable to preheat the butyl rubber at 280° to 340° F. for 3 to 30 minutes with not only the para dinitroso benzene, but also with one or more of the following; the mold release agent (e.g. stearic acid), zinc oxide, and calcined clays such as kaolin.

Referring now to the drawing, the single figure depicts a pneumatic tubeless tire, mounted on tire wheel rim 12, said tire comprising a hollow toroidal type member which is substantially U shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said area 13 of the tire. The remaining construction of the tire may vary according to conventional fabrication, but in general, the tire is a multi-layered type of structure with an outer layer as above-mentioned. The layer next adjacent the outer layer generally comprises a carcass 15 which includes a rubber which has incorporated therein a fabric composed of a plurality of cotton, rayon or nylon cords, etc. The tire also includes an inner lining 16 advantageously made from 50 to 99 parts by weight of rubber. e.g. butyl rubber per se, and/or covulcanizates (or partially cured covulcanizates) of butyl rubber and GR–S rubber, all vulcanized with the compositions comprising both an amido compound and a quinoid type curing agent according to the present invention. The inner lining must be substantially impermeable to air. The lining preferably comprises about 100 parts by weight of butyl rubber, without other rubbers, at least partially vulcanized according to the invention with 0.5 to 15.0 parts by weight of an amido compound and 0.5 to 15.0 parts of a non-sulfur containing quinoid type curing agent.

The rubber of the inner liner may also comprise the reaction product of about 70 to 99.5 weight percent of a $C_4$ to $C_7$ iso-olefin, such as isobutylene, and about 0.5 to 30 weight percent of a $C_4$ to $C_{14}$ multi-olefin, such as isoprene which has been at least partially vulcanized with the above amido and quinoid compounds. The above multi-layers, at least three in number, are conventionally bonded or otherwise adhered together, for example, by cementing and/or especially by vulcanization to form a tire of a unitary structure.

The butyl rubber-containing vulcanized compositions of the present invention not containing other rubbery polymers in addition to butyl rubber may be employed generally throughout the tire. For instance, in addition to the inner lining, the other layers of the tire such as the intermediate carcass layer and/or the outer layer (including the tread area, the sidewall and the outer bead portion, etc.) advantageously comprise butyl rubber vulcanized in the presence of both an amido and quinoid compound in accordance with the invention.

In another embodiment, the inner liner of the tire may be butyl rubber which has been at least partially vulcanized with 1 to 10 weight percent of substantially saturated rubbers, which composition has been at least partially vulcanized in the presence of both quinoid and amido compounds according to the present invention. Partial vulcanization is obtained by heating the aforesaid compositions for about 3 to 60 minutes or more at about 100° to 350° F. or higher with any of the heretofore disclosed curing compositions.

When an inner lining contains such compositions as the above, especially butyl rubber per se (i.e. in the absence of other rubbers) which has been composited with about 5 to 40 weight percent, preferably 15 to 30 weight percent of conventional hydrocarbon extender oils, and subsequently at least partially vulcanized according to the invention with an admixture of amido and quinoid compounds, such inner lining exhibits increased retention of air, and a tubeless tire containing the same is of increased commercial value. The products obtained by vulcanizing the foregoing butyl rubber compositions according to the present invention are also of commercial importance in improved wire insulation, rubber window channels, in rubberizing fabrics, and in other applications where butyl rubber has utility.

While there are above described a number of specific embodiments of the present invention, it is obviously possible to produce other embodiments and various equivalent modifications and variations thereof without departing from the spirit of the invention or the scope of the appended claims.

What is claimed is:

1. A rubbery vulcanizable composition of matter comprising about 100 parts by weight of a butyl rubber copolymer of a major proportion of a $C_4$ to $C_8$ isoolefin with a minor proportion of a $C_4$ to $C_{14}$ multiolefin, about 0.5 to 15 parts by weight of a quinoid compound, and about 0.1 to 5.0 parts by weight of an amido compound having the formula

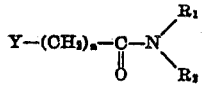

wherein Y is selected from the group consisting of hydrogen, alkyl, acylated alkyl, aralkyl, alkaryl, aryl, acyl, amino and amido; $n$ being an integer between about 0 to 15; $R_1$ and $R_2$ being selected from the group consisting of hydrogen, halogen, alkyl, alkaryl, aralkyl and aryl; said composition being free of elemental sulfur.

2. Composition according to claim 1 which further contains about 2 to 3 parts by weight of a lead oxide.

3. Composition according to claim 1 which further contains about 0.1 to 10.0 parts by weight of a rubbery copolymer of butadiene and styrene per part by weight of the isoolefin-multiolefin copolymer.

4. A vulcanizable rubbery composition comprising about 100 parts by weight of an isoolefin-multiolefin butyl rubber copolymer, about 0.5 to 5.0 parts by weight of a quinoid compound, and about 0.5 to 15 parts by weight of an amido compound having the formula:

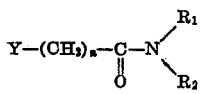

wherein Y is selected from the group consisting of hydrogen, alkyl, acylated alkyl, aralkyl, alkaryl, aryl, acyl, amino and amido; $n$ being an integer between about 0 to 15; $R_1$ and $R_2$ being selected from the group consisting of hydrogen, halogen, alkyl, aralkyl, alkaryl, and aryl; said composition being free of elemental sulfur.

5. Composition according to claim 4 which further contains about 10 to 90 parts by weight of a rubbery copolymer of butadiene and styrene.

6. Composition according to claim 4 which further contains per 100 parts by weight of total rubber hydrocarbon about 1 to 10 parts by weight of benzothiazyl disulfide.

7. Composition according to claim 4 which further contains per 100 parts by weight of total rubber hydrocarbon about 2 to 30 parts by weight of zinc oxide.

8. Composition according to claim 4, which further contains per 100 parts by weight of total rubber hydrocarbon about 10 to 150 parts by weight of a member selected from the group consisting of clay, carbon black, and mixtures thereof.

9. Composition according to claim 4 in which the amido compound is N-lauroyl para-amino-phenol.

10. Composition according to claim 4 in which the amido compound is stearamide.

11. Composition according to claim 4 in which the quinoid compound is paraquinone dioxime.

12. Composition according to claim 4 in which the quinoid compound is paraquinone dioxime dibenzoate.

13. Composition according to claim 4 which further contains about 2 to 30 weight percent, based on butyl rubber, of an oxide of lead.

14. Vulcanized composition according to claim 4 which has been cured in the substantial absence of elemental sulfur with about 2 to 30 parts by weight of zinc oxide in the absence of sulfur at a temperature between about 300° and 500° F.

15. An article of manufacture comprising the composition according to claim 4 which has been coated and vulcanized, in the absence of sulfur, on wire as an insulation therefor.

16. A process for vulcanizing butyl rubber at an accelerated rate which comprises blending with the composition of claim 4, about 2 to 30 parts by weight of zinc oxide, and curing the resulting blend in the absence of elemental sulfur at a temperature between about 350° to 450° F. for a time sufficient to vulcanize the same.

17. In a process for producing a tubeless rubber tire, the improvement which comprises forming at least the inner layer thereof by blending with the composition of claim 4 about 2 to 10 parts of benzothiazyl disulfide, and about 3 to 20 parts by weight of zinc oxide, and at least partially vulcanizing the resulting blend in the absence of elemental sulfur at a temperature between about 200° and 500° F.

18. A tubeless butyl rubber tire which contains in at least the inner lining thereof the composition of claim 4 which has been at least partially vulcanized in the absence of elemental sulfur at about 250° to 400° F. in the presence of about 2 to 30 parts of zinc oxide and about 3 to 10 parts by weight of a lead oxide, said lining being of low permeability to air.

References Cited in the file of this patent

UNITED STATES PATENTS

| | | |
|---|---|---|
| 2,325,947 | Garvey | Aug. 3, 1943 |
| 2,393,321 | Haworth | Jan. 22, 1946 |
| 2,683,132 | Young et al. | July 6, 1954 |